Patented Apr. 14, 1931

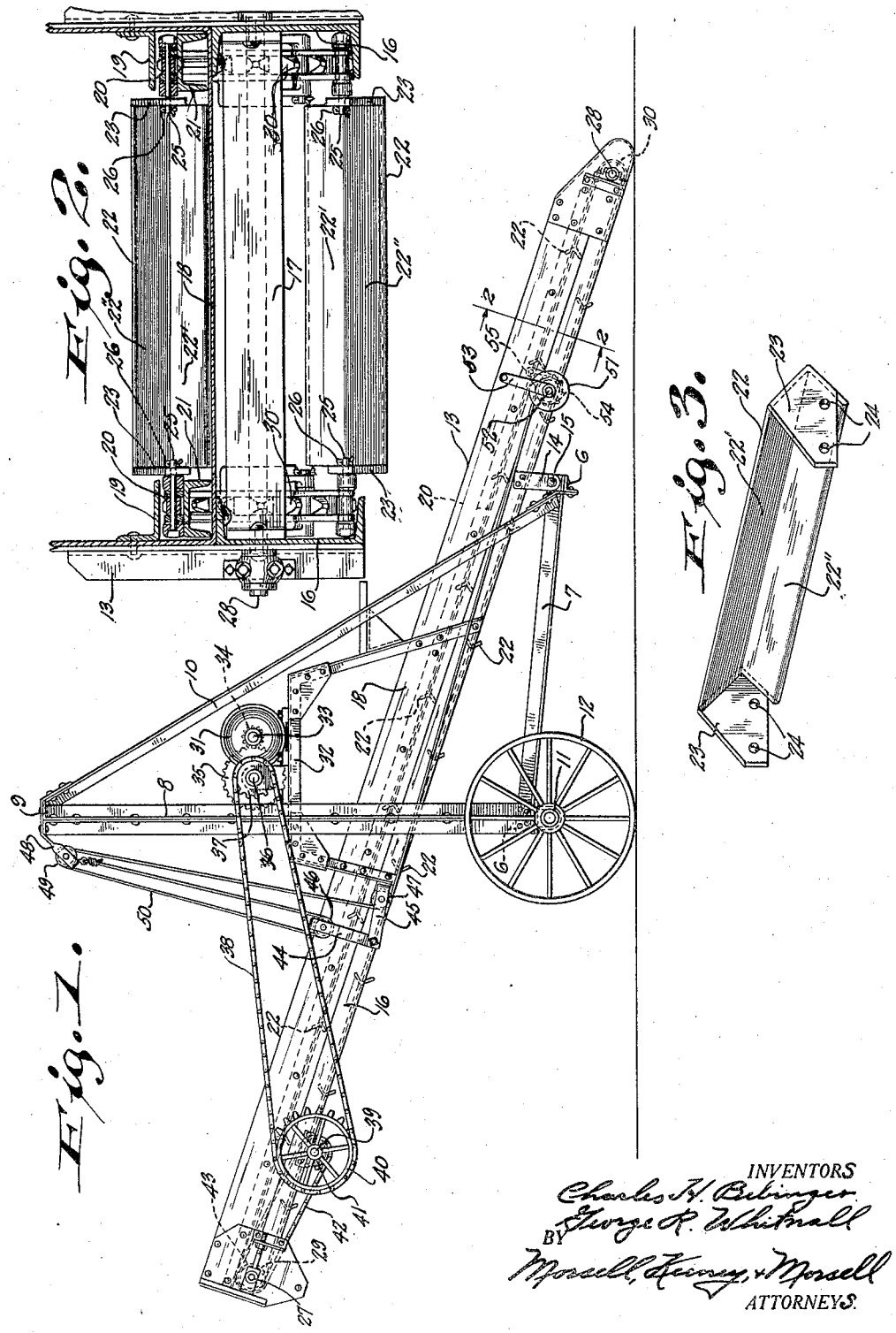

1,800,428

UNITED STATES PATENT OFFICE

CHARLES H. BEBINGER AND GEORGE R. WHITNALL, OF JANESVILLE, WISCONSIN, ASSIGNORS TO NORTHERN CONVEYOR & MFG. CO., OF JANESVILLE, WISCONSIN, A CORPORATION OF WISCONSIN

MATERIAL-HANDLING MACHINE

Application filed November 16, 1928. Serial No. 319,809.

This invention relates to improvements in material handling machines.

It is one of the objects of the present invention to provide in a material handling machine of the portable chain conveyor type, a conveyor formed with cupped, one-piece steel flights.

A further object of the invention is to provide in a machine of the class described, angled flight members arranged to have their upper flanges disposed directly over their lower flanges, whereby each flight forms a cup, when in carrying position, at right angles to the pan of the machine.

A further object of the invention is to provide a material handling machine in which the conveyor is composed of a pair of chains with a plurality of angled or cupped flights secured in spaced relation therebetween, both ends of each flight being formed with a plate punched with a pair of holes for the attachment of a pair of long chain pins. The result of this arrangement is that the shearing strength of the four pins carrying each flight closely approaches the ultimate strength of the pair of chains and each flight is carried by the chains in an exceptionally strong and ingenious manner, eliminating the danger of bending or breaking present in the usual type of chain conveyors.

A further object of the invention is to provide a machine of the class described in which there are mounted adjacent the pan or trough over the drag chain portions a pair of longitudinal members which serve as shields to divert material from the chains and also serve to facilitate the cleaning of the trough by the flights, said longitudinal shield members also extending partially around the lower rollers at the hopper end of the machine to particularly divert material from the chains at this end.

A further object of the invention is to provide a machine of the class described in which the frame is composed of a minimum number of members including a pair of opposed and braced longitudinal steel members above which the conveyor trough is longitudinally mounted, the latter serving as a trough for the conveying of material and also as a truss for the supporting frame, permitting the building of the frame in exceptionally long lengths without any sacrifice of strength or rigidity. In addition, the lower flanges of the longitudinal steel members serve as the supports for the return of the drag chains, and hence the conveyor trough and steel members both serve dual purposes, whereby the number of parts of the machine and its weight are minimized.

A further object of the invention is to provide a machine of the class described in which the steel guides or tracks for carrying the upper lengths of the drag chains are simply mounted within the trough and may be readily replaced when worn.

A further object of the invention is to provide a scraper for material handling machines which is of very simple construction, is strong and durable, and is well adapted for the purpose described.

With the above and other objects in view, the invention consists of the improved material handling machine, and its parts and combinations as set forth in the claims, and all equivalents thereof.

In the accompanying drawing in which the same reference characters indicate the same parts in all of the views:

Fig. 1 is a side view of a material handling machine embodying the features of the invention;

Fig. 2 is a cross-sectional view thereof taken on line 2—2 of Fig. 1 and on a larger scale; and Fig. 3 is a detail perspective view of a flight member used in the conveyor.

Referring now more particularly to the drawing, it will appear that the machine comprises a lower truck frame formed of a pair of spaced-apart angle members 6 connected by a pair of diverging intermediate angle members 7. Extending vertically upwardly from one of the members 6 are frame members 8 connected at their upper end portions by an upper transverse member 9. A pair of frame members 10 extend angularly downwardly from the upper transverse member 9 to the other angle member 6. An axle 11 depends from this member 6 and a pair of wheels 12 are mounted on said axle.

The conveyor frame, indicated generally by the numeral 13, is provided with a pair of depending arms 14 through which a pivot rod 15 is extended and said rod also extends through openings in the adjacent end portions of the members 7, whereby the conveyor frame is pivotally mounted with respect to the truck frame for adjusting the elevation of the discharge end of the conveyor frame.

The construction of the conveyor or scraper frame is shown in detail in Fig. 2 and will be seen to comprise a pair of opposed longitudinally extending channel members 16 secured together at spaced intervals by angle bars 17. An elongated metallic trough 18 U-shaped in cross-section, is mounted on the upper flanges of said channel members and extends longitudinally of the conveyor. Also, a pair of opposed elongated angle bars 19 are bolted to the opposite inner side faces of the trough and the lower flanges of said bars 19 are spaced above the trough bottom portion providing longitudinal channels for the drag chains 20 to move along, said chains riding on inverted channel bars 21 bolted to the trough and readily removable for replacement, when worn.

The conveyor is composed of the opposed drag chains 20 previously mentioned, and a plurality of spaced flight members 22 extended transversely between the chains. The flights are of a peculiar and advantageous construction, and one of the same is shown in detail in Fig. 3. Each flight member is formed of a length of angled steel, the flanges thereof being designated 22' and 22", respectively, and the ends of said angled member have welded thereto, for closures, steel plates 23, each being provided with a pair of spaced apertures 24.

The drag chains 20 where it is desired to secure a flight member, are provided with pairs of opposed long pins 25 which are extended through said plate apertures 24 and are secured by cotter pins 26. Hence, each flight is carried by a total of four pins whose shearing strength closely approaches the ultimate strength of both chains, resulting in a very strongly attached flight. When the flights are thus secured they are disposed in the angular position shown with the edges of their upper flanges directly over the edges of their lower flanges, forming cupped or bracket-like members at right angles to the pan portion of the trough, when in carrying positions.

As before noted, the upper lengths of the drag chains ride on the members 21 below the flanges of the angle bars 19. Said bars serve to divert material from the chains and also hold the chains in close proximity to the trough to cause the flights to clean the trough. The lower lengths of the chains ride on the lower flanges of the elongated channel members 16. At each end on the conveyor frame shafts 27 and 28 are journaled carrying sprocket wheels 29 and 30 about which said chains extend.

Power for operating the conveyor is obtained from an electric motor 31 mounted on a platform 32 supported over the conveyor. The motor shaft 33 carries a small gear 34 meshing with a large gear 35 mounted fast on a shaft 36, said shaft also having mounted fast thereon a sprocket 37 over which a driving chain 38 extends. A shaft 39 is journaled in a suitable bearing near the upper end portion of the conveyor and said shaft has fast thereon a larger sprocket 40 engaged and driven by the chain 28. Also mounted fast on the shaft 39 is a small sprocket 41 around which a second drive chain 42 extends, and said chain also engages a sprocket 43 on the upper conveyor shaft 27, whereby said shaft and the sprockets 29 carrying the drag chains 20 are operater.

For the purpose of adjusting the elevation of the conveyor frame pairs of pulley blocks 44 and 45, carrying pulleys 46 and 47, are secured to opposite sides of the conveyor frame. Also, a pair of pulley blocks 48 carrying pulleys 49 are secured to the upper truck frame member 9. A pair of cables 50, having their end portions secured in the pulley blocks 48, extend around the pulleys 46, 49 and 47, and are wound at their other end portions on drums 51, the shaft 52 upon which the drums are mounted also carrying a crank 53. Upon rotation of the drums, by means of the crank, the discharge end portion of the conveyor is raised or lowered, and is maintained in adjusted positions by the ratchet 54 and cooperating dog 55.

It will thus be seen that in the improved machine the flights are of a very simple and efficient design and the connections between the flights and the drag chains insure a maximum strength. Also, the conveyor frame is both strong and light and the component parts thereof perform double functions. The trough operates in its usual manner, and in addition, because of its mounting on the upper flanges of the channel members 16, it serves as a truss for said frame. The angle members 19 serve to hold the conveyor closely against the trough and also shield the chains, while the lower flanges of the channel members 16 support the under portions of the chains. Furthermore, the improved material handling machine is of very simple and novel construction and is well adapted for the purposes described.

What we claim as our invention is:

1. In a material handling machine, a conveyor frame, comprising a pair of spaced elongated frame bars having upper and lower flanges, transverse bars connecting said frame bars, an elongated trough mounted on and secured to said upper flanges and serving as a frame supporting truss, and a pair of spaced drag chain slides mounted within said trough.

2. In a material handling machine, a conveyor frame, comprising a pair of spaced elongated frame bars having upper and lower flanges, transverse angle bars connecting said frame bars, an elongated trough having side portions and mounted on and secured to said upper flanges, a pair of spaced drag chain slides mounted within said trough, a pair of endless drag chains extending longitudinally of and around said frame, the upper portions of said chains moving on said slides and the lower portions of said chains being supported by and moving on the lower flanges of the frame bars, and a pair of elongated angle members secured to the inner side walls of the trough and serving as guides and shields for said chains.

3. In a material handling machine, a conveyor frame including a pair of spaced elongated frame bars having upper and lower flanges, transverse angle bars connecting said frame bars, an elongated trough having side portions and mounted on and secured to said upper flanges, a pair of spaced drag chain slides removably mounted within said trough, a pair of elongated guide and shield angle bars secured to the inner side walls of the trough and above said drag chain slides, an endless conveyor movably mounted around and longitudinally of said conveyor frame, said conveyor including a pair of drag chains and flight members extended transversely therebetween, and the upper portions of the drag chains resting on said slides and below the guide and shield angle bars and the lower portions of said chains resting on the lower flanges of the frame bars.

In testimony whereof, we affix our signatures.

CHARLES H. BEBINGER.
GEORGE R. WHITNALL.